United States Patent [19]

Richter, Jr. et al.

[11] Patent Number: 4,581,134

[45] Date of Patent: Apr. 8, 1986

[54] CRUDE OIL DEHYDRATOR/DESALTER CONTROL SYSTEM

[75] Inventors: Albert P. Richter, Jr.; Ray Tuggle; Ralph H. Clinard, Jr., all of Houston; Ronald L. Campsey, Aliff; Frank L. Lankford, Jr., Bellaire, all of Tex.

[73] Assignee: Texaco Inc., White Plains, N.Y.

[21] Appl. No.: 655,266

[22] Filed: Sep. 28, 1984

[51] Int. Cl.$^4$ ............................................. B01D 17/05
[52] U.S. Cl. .................................. 210/96.1; 210/101; 210/105; 210/206
[58] Field of Search ...................... 210/96.1, 101, 105, 210/100, 206; 55/160, 172–176

[56] References Cited

U.S. PATENT DOCUMENTS

| | | | |
|---|---|---|---|
| 2,151,248 | 8/1938 | Vaughan | 55/172 |
| 2,773,556 | 12/1956 | Meyers et al. | 55/160 |
| 3,163,173 | 12/1964 | Kuntz | 210/96.1 |
| 3,469,373 | 9/1969 | Lavery et al. | 55/174 |
| 3,966,603 | 6/1976 | Grant | 210/96.1 |
| 4,282,093 | 8/1981 | Haga | 210/101 |

Primary Examiner—John Adee
Attorney, Agent, or Firm—Robert A. Kulason; James J. O'Loughlin; Ronald G. Gillespie

[57] ABSTRACT

A system, which controls the content of an impurity in a crude oil stream, includes an injector which injects a demulsifier into a stream of produced wet crude oil in response to a control signal. A three-phase separator receives the produced crude oil with demulsifier and partially separates produced water and gas from the crude oil to provide a separated wet crude oil stream. Apparatus mixes wash water in with the separated crude oil stream in accordance with a control signal to provide a crude oil/wash water stream. A dehydrator removes substantial amount of water from the crude oil/wash water stream to provide a dehydrated crude oil stream. A monitor monitors the content of a predetermined type of impurity in the dry crude oil stream and provides a corresponding impurity content signal to control apparatus. The control apparatus provides the first and second control signals in accordance with the signal from the monitor so as to control the impurity's content of the dry crude oil stream.

11 Claims, 3 Drawing Figures

CRUDE OIL DEHYDRATOR/DESALTER CONTROL SYSTEM

BACKGROUND OF THE INVENTION

Field of the Invention

The present invention relates to control systems in general, and more particularly, to control systems for crude oil streams.

SUMMARY OF THE INVENTION

A system, which controls the content of an impurity in a crude oil stream, includes an injector which injects a demulsifier into a stream of wet crude oil in response to the first control signal. A three-phase separator receives the produced wet crude oil with demulsifier and partially separates produced water and gas from the crude oil to provide a separated wet crude oil stream. Apparatus mixes wash water in with the separated crude oil stream in accordance with a second control signal to provide a crude oil/washwater stream. A dehydrator removes substantial amounts of water from the crude oil/washwater stream to provide a dry crude oil stream. A monitor monitors the content of a predetermined type of impurity in the dry crude oil stream and provides a corresponding impurity content signal to control apparatus. The control apparatus provides the first and second control signals in accordance with the signal from the monitor so as to control the impurity's content in the dry crude oil stream.

The objects and advantages of the invention will appear more fully hereinafter from a consideration of the detailed description that follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF A PREFERRED EMBODIMENT OF THE INVENTION

Figure 1:
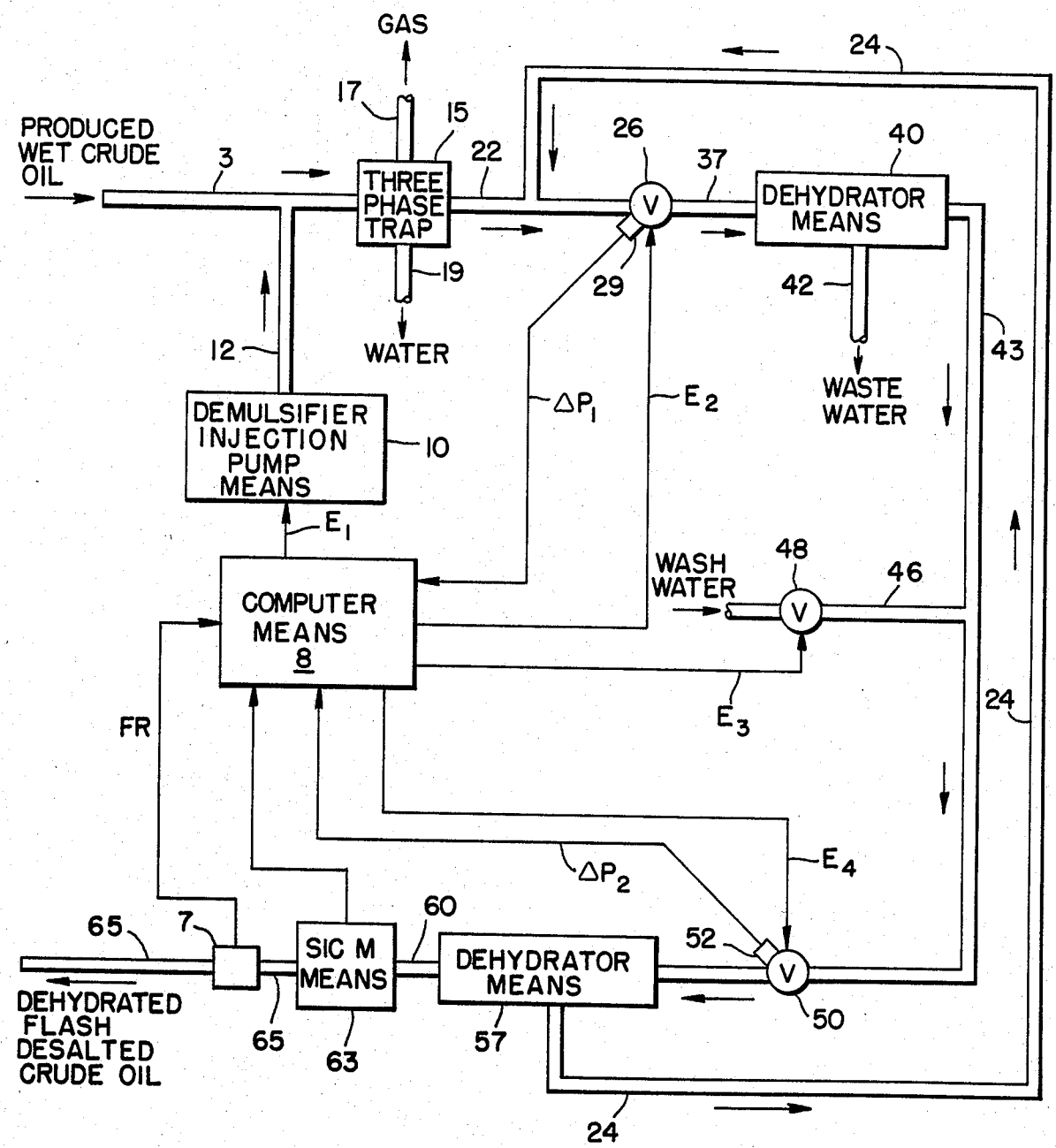
FIG. 1 includes a simplified block diagram of a control system, constructed in accordance with a preferred embodiment of the present invention, controlling a dehydration and desalting system, shown in partial schematic form, processing a wet crude oil stream.

Referring to FIG. 1, there is shown a two stage crude oil stream dehydration/desalting system which includes a pipe 3 receiving produced wet crude oil, hereinafter referred to as crude. A flow sensor 7 senses the flow rate of dehydrated/desalted crude in a line 65 and provides a corresponding signal to computer means 8. A demulsifier injection pump means 10, in response to a control signal $E_1$ from computer means 8, pumps a demulsifier through a line 12 into line 3. Computer means 8 may include a microprocessor and memory. Demulsifier injection pump means 10 includes a conventional injection type pump commonly called injectors, which may be manufactured by the Texsteam Company. The actual make and model of the pump will depend on the operating parameters of the system.

The stream in line 3 enters a three phase trap 15, which may be of a conventional type, to draw off gas through a line 17 and waste water through a line 19. The remaining crude exits through a line 22 which has water entering into it from a line 24. The water and crude oil are provided to a mixing valve 26. Mixing valve 26 is of the type that controls the mixing of fluids by a pressure drop across the input and output of valve 26. The pressure drop controls the size of water and brine droplets so they can coalesce. The pressure drop is sensed by a differential pressure sensor 29 providing a signal $\Delta P_1$ to computer means 8. Valve 26 is controlled by a signal $E_2$ from computer means 8. The mixture from valve 26 is provided by way of a line 37 to dehydrator means 40 which may be of the conventional electrostatic separator type, such as manufactured by the Petreco Division of Petrolite Corporation. Dehydrator means 40 provides waste water through a line 42 and a drier crude oil through a line 43.

Wash water is provided to line 43 by way of a line 46 which includes a valve 48 controlled by a signal $E_3$ from computer means 8 to permit the proper quantity of wash water to be added to the crude oil in the line 43.

Another mixing valve 50 is controlled by a signal $E_4$ from computer means 8 and operates in the same manner as mixing valve 26. A differential pressure sensor 52 senses the pressure drop across valve 50 and provides a corresponding signal $\Delta P_2$ to computer means 8. The mixture from valve 50 enters another dehydrator means 57 which is of a similar type as dehydrator means 40. Dehydrator means 57 provides its water through line 24 to be fed back into line 22. Dehydrated crude oil from dehydrator means 57 is provided by way of a line 60 to a salt-in-crude (SICM) monitor means 63 which may be of the type described and disclosed in U.S. Pat. No. 4,200,789. Salt-in-crude monitor means 63 provides a SICM signal to computer means 8, representative of the concentration of salt in the dehydrated crude leaving salt-in-crude monitor means 63 by way of line 65.

It should be noted that certain wet crude oils have high salt water content. In some instances it is as high as 30 percent by volume. Whereas the dehydrated crude oil after the dehydrating operation generally has a water content of 0.1 to 0.3 percent by volume and the the desired salt content is usually less than 10 lbs. salt per thousand barrels (PTB) of the crude oil.

Figure 2A:
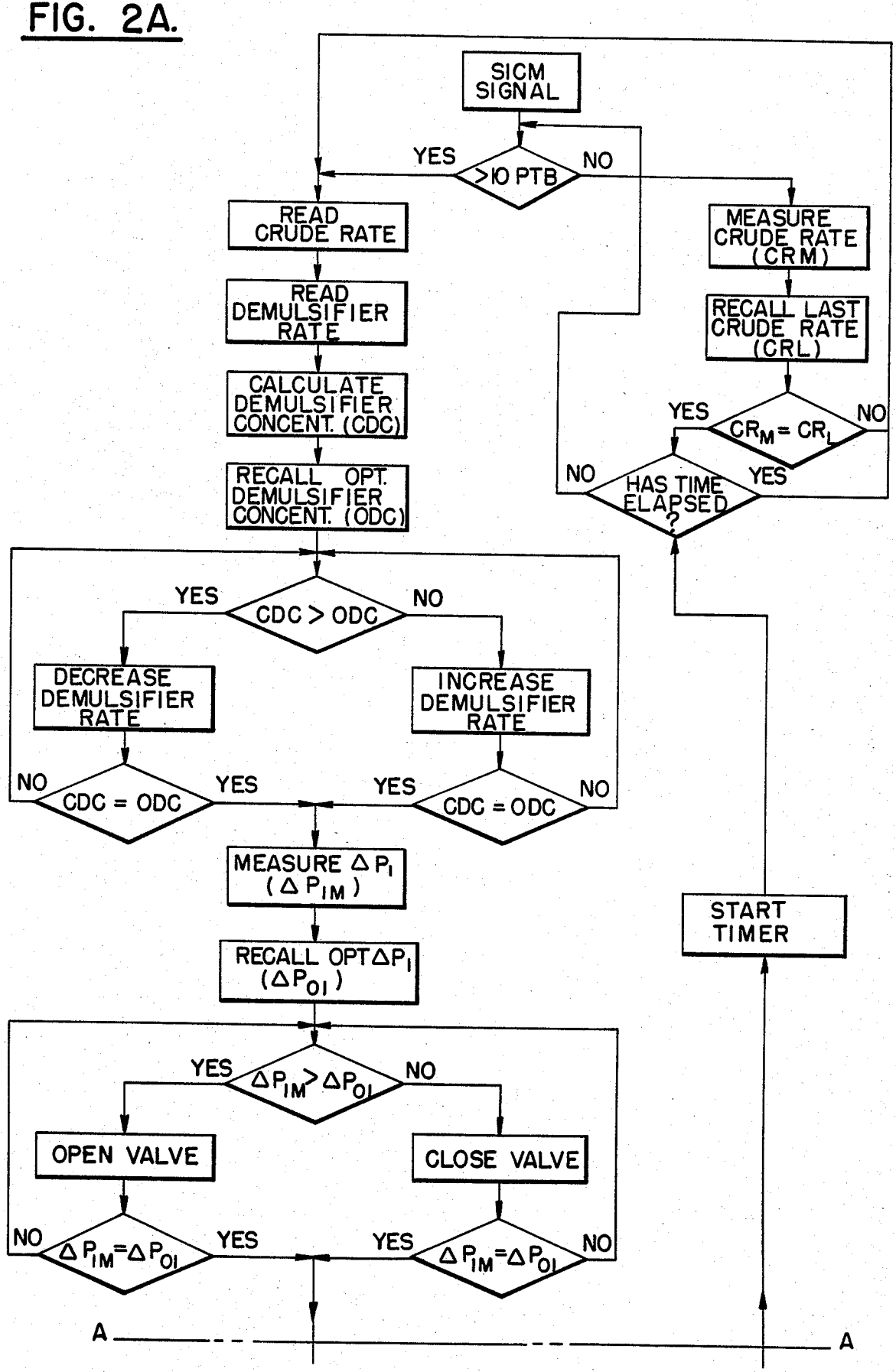
FIGS. 2A and 2B, when matched along line A—A, provide a simplified flow diagram of a program used by the computer means shown in FIG. 1.
Figure 2B:
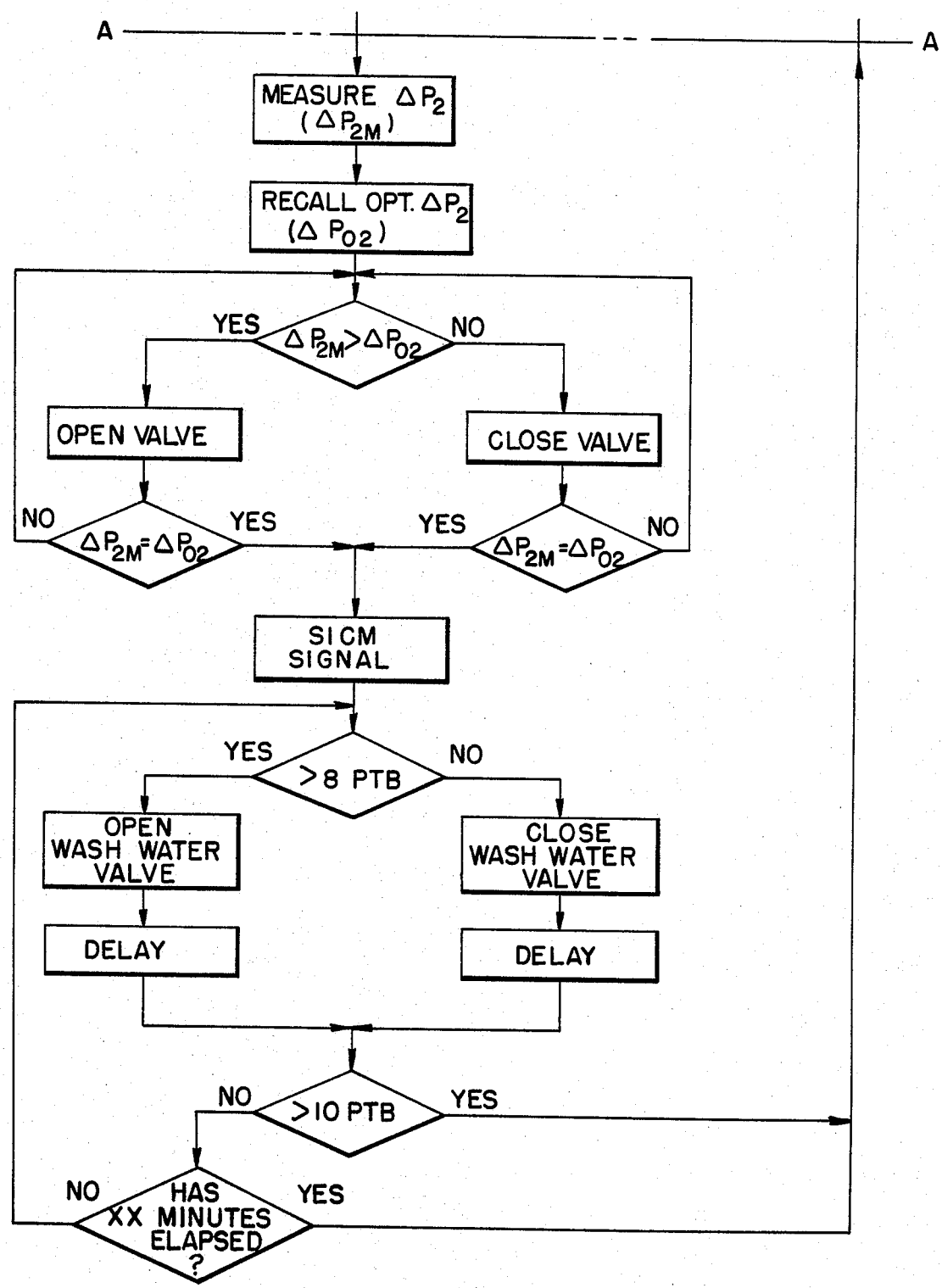

With reference also to FIGS. 2A and 2B, at the start of an operational cycle, computer means 8 reads the flow rate signal from flow rate sensor 7, it reads the demulsifier rate which is actually the rate impressed upon demulsifier injection means pump means 10 and from these two parameters it calculates the demulsifier content of the crude oil going into three-phase trap 15.

Computer means 8 has stored within it a predetermined optimum demulsifier concentration which is composed with the calculated demulsifier concentration. If the calculated demulsifier concentration is greater than the optimum demulsifier concentration then the pumping rate of demulsifier by pump means 10 is decreased until the calculated demulsifier concentration substantially equals the optimum demulsifier concentration. If the demulsifier concentration is less than the optimum demulsifier concentration, the demulsifier rate is increased until the calculated demulsifier concentration equals the optimum demulsifier concentration.

Computer means 8 reads the $\Delta P_1$ signal so as to measure $\Delta P_1$ which is henceforth referred to as $\Delta P_{1M}$. Computer means 8 also recalls a predetermined optimum $\Delta P_1$ which is referred to as $\Delta P_{01}$. The value for $\Delta P_{1M}$ is compared with the value for $\Delta P_{01}$. If $\Delta P_{01}$ equals $\Delta P_{1M}$, value 26 setting is not changed. If $\Delta P_{M1}$ is greater than $\Delta P_{01}$, valve 26 is opened until $\Delta P_{1M}$ equals $\Delta P_{01}$. The reverse is true when $\Delta P_{1M}$ is less than $\Delta P_{01}$, in which case valve 26 is closed until $\Delta P_{1M}$ equals $\Delta P_{01}$.

This step is again repeated with $\Delta P_2$ and a stored predetermined optimum $\Delta P_2$ value in which case it is valve 50 being opened or closed as necessary to achieve $\Delta P_{2M}$ equals $\Delta P_{02}$.

The signal from salt-in-crude monitor means 63 is again monitored and if the dehydrated crude oil salt content is greater than 8 PTB, signal $E_3$ causes valve 48 to open more to increase the wash water entering line 43. Computer means 8 then goes through a time delay and a review of the SICM signal is again made. When the SICM signal represents less than 10 PTM of salt, an operational stabilization timer is started as indicated by the diamond shaped block entitled "start timer". The timer runs for a predetermined time interval and returns to an off condition. This time interval allows the process system to stabilize after which the operational cycle as hereinbefore described is repeated. This is accomplished by querying the timer "has time elapsed", when the answer is yes then the operational cycle is instituted.

When the SICM signal represents more than 10 PTM of salt, a further question is asked "have XX minutes elapsed?" The term XX minutes refers to a time interval to assure that a sufficient time has elapsed between a command to wash water valve 48 and the effect of the change in the wash water.

If XX minutes have elapsed, then the operational timer is started as hereinbefore explained. When XX minutes have not elapsed, the operational cycle, as previously described, is initiated. That is the SICM signal is monitored to determine whether the salt content is less than or greater than 8 PTM and wash wave valve 48 is operated accordingly.

When the dehydrated crude oil salt content is greater than 8 PTB, the operational cycle, as previously described, is initiated.

When the dehydrated crude oil salt content is not greater than 8 PTB, the crude rate is measured ($CR_M$), the last crude rate measurement ($CR_L$) is recalled and $CR_M$ and $CR_L$ are compared. If $CR_M$ and $CR_L$ are not equal, the operational cycle as hereinbefore described is initiated. If $CR_M$ equals $CR_L$, then a determination is made as to whether the time interval between operational cycles has elapsed. If the time interval has not elapsed, the signal from salt-in-crude monitor means 63 is monitored to see if the salt content of the dehydrated crude oil is or is not greater than 10 PTB, as hereinbefore described. The net result is that if the salt content is not greater than 8 PTB and the time interval has not elapsed, the control system recycles until either the time interval has elapsed or the salt content increases to above 10 PTB.

The present invention hereinbefore described is a control system for a two stage desalting system. However, it is applicable to a single stage desalting system or one having more than two stages. It would be obvious to one skilled in the art how to adapt the control system for either eventuality. Further, the described embodiment of the present invention monitors the salt content, it would be obvious to one skilled in the art that the present invention may also be practiced with a water cut monitor if the impurity to be reduced is not salt but fresh water or even salt water. The controlling parameter would be the water content of the dry crude instead of the salt content.

What is claimed is:

1. A system for controlling the content of an impurity in a crude oil stream comprising:
    means for adding a demulsifier to a stream of produced wet crude oil,
    means for receiving the produced wet crude oil stream with demulsifier for separating produced water and gas from the crude oil to provide a separated crude oil stream,
    at least one mixing means receiving wash water and the separated crude oil stream for mixing the wash water with the separated crude oil stream in accordance with a control signal to provide a crude oil/wash water stream,
    means for sensing a pressure drop across the mixing means and providing a pressure drop signal representative thereof, and
    at least one dehydrator means for removing substantial amounts of water from the crude oil/wash water stream to provide a dehydrated crude oil stream,
    means for monitoring the content of the impurity in the dehydrated crude oil stream and providing an impurity content signal representative thereof, and
    control means for providing the control signal in accordance with the impurity content signal and the pressure drop signal so as to control the impurity content of the dry crude oil stream.

2. A system as described in claim 1 further comprising:
    flow regulating means for regulating the flow of the wash water being received by the mixing means in accordance with a second control signal from the control means; and
    in which the second control signal is provided in accordance with the impurity content signal.

3. A system as described in claim 2 further comprising:
    sensing the flow rate of the produced wet crude stream and providing a corresponding crude oil flow signal; and
    in which the control means provides a third control signal to the adding means to control the amount of demulsifier being added to the produced wet crude stream, said third control system being provided in accordance with the impurity signal and the crude oil flow signal.

4. A system for controlling the content of an impurity in a crude oil stream comprising:
    means for adding a demulsifier to a stream of produced wet crude oil,
    means receiving the produced wet crude oil stream with demulsifier for separating produced water and gas from the crude oil to provide a separated crude oil stream,
    first mixing means receiving water and the separated crude oil for mixing the water with the separated crude oil to provide a crude oil/water stream,
    first means for sensing a pressure drop across the first mixing means and providing a first pressure drop signal representative thereof,
    first dehydrator means for removing substantial amounts of water from the crude oil/water stream to provide a crude oil stream,
    second mixing means receiving wash water and the crude oil stream from the first dehydrator means for mixing the wash water and the crude oil to provide a crude oil/wash water stream, second dehydrator means receiving the crude oil/wash water stream for removing substantial amounts of the water to provide a dehydrated crude oil stream, means for monitoring the content of the impurity in the dehydrated crude oil stream and providing an impurity content signal representative thereof, and means for controlling the adding of the demulsifier to the produced wet crude oil stream and for controlling at least one of the mixing means in accordance with the impurity content signal from the monitor means and the first pressure drop signal from the first sensing means.

5. A system as described in claim 4 further comprising:

flow regulating means for regulating the flow of the wash water being received by the second mixing means in accordance with a second control signal from the control means; and in which the second control signal is provided in accordance with the impurity content signal.

6. A system as described in claim 5 further comprising:

sensing the flow rate of the produced wet crude stream and providing a corresponding crude oil flow signal; and in which the control means provides a third control signal to the adding means to control the amount of demulsifier being added to the produced wet crude stream, said third control system being provided in accordance with the impurity signal and the crude oil flow signal.

7. A system as described in claim 6 in which the control means controls the second mixing means with a fourth control signal.

8. A system as described in claim 7 further comprising:

sensing a pressure drop across the second mixing means and providing a corresponding second pressure drop signal; and in which the control means provides the fourth control signal in accordance with the impurity content signal and the second pressure drop signal.

9. A system as described in claim 4 further comprising:

means for sensing a pressure drop across the second mixing means and providing a pressure drop signal representative thereof; and in which the control means provides a first control signal to the second mixing means in accordance with the impurity content signal and the pressure drop signal.

10. A system as described in claim 9 further comprising:

flow regulating means for regulating the flow of the wash water being received by the second mixing means in accordance with a second control signal from the control means; and in which the second control signal is provided in accordance with the impurity content signal.

11. A system as described in claim 10 further comprising:

sensing the flow rate of the produced wet crude oil stream and providing a corresponding crude oil flow signal; and in which the control means provides a third control signal to the adding means to control the amount of demulsifier being added to the produced wet crude oil stream, said third control system being provided in accordance with the impurity signal and the crude oil flow signal.

* * * * *